Dec. 3, 1968   C. F. SCHORN   3,413,863
LOCKING ADJUSTMENT DEVICE
Filed Aug. 25, 1966

INVENTOR.
CARL F. SCHORN
BY W. Patnoske, Jr.
ATTORNEYS

United States Patent Office 3,413,863
Patented Dec. 3, 1968

3,413,863
LOCKING ADJUSTMENT DEVICE
Carl F. Schorn, Birmingham, Mich., assignor to Holley Carburetor Company, Warren, Mich., a corporation of Michigan
Filed Aug. 25, 1966, Ser. No. 575,156
9 Claims. (Cl. 74—89.15)

ABSTRACT OF THE DISCLOSURE

An axial adjustment and locking device includes first and second engaging members with one of said members having formed thereon a plurality of circumferentially spaced axially extending and radially directed protuberances and the other of said members having formed thereon a plurality of axially extending and radially directed grooves with said grooves being of a configuration adapted to at times receive therein the protuberances of said one of said members; both of the first and second engaging members being threaded in a manner so as to have the grooves at least partially interrupt the otherwise continuous thread form and so that the protuberances also contain the thread form; the first and second members being thusly effective to have the threaded portion of the protuberances threadably engage the threaded portion between the grooves, for relative axial movement therebetween, and also effective to at times have the protuberances moved out of threaded engagement and into juxtaposition with the grooves.

---

This invention relates generally to connectors, or spacers and the like, and more particularly to a novel threaded, locking adjustable device having general utility.

In many applications, such as aircraft fuel control mechanisms, just for example, there is a need for a spacer or connector which provides means for making very minute adjustments in the distance between a pair of associated members, and which has means for maintaining the proper adjustment, without having to disassemble the members involved, as has previously been the case, in order to add or remove shims, for example.

Accordingly, a primary object of this invention is to provide a novel adjusting and locking connector or spacer device.

Another object of the invention is to provide such a device which essentially consists of only two threaded pieces.

A further object of the invention is to provide such a device which is easily manufactured and efficient in operation.

Another object of the invention is to provide such a device operating in part on the principle of elastic limit of the material from which the device is formed.

A more specific object of the invention is to provide such a device which includes mating interferences formed on male and female components of a threaded assembly.

A still further object of the invention is to provide such a device wherein the mating interferences comprise a row or rows of projections and grooves formed across the threads of the male and female components.

Another object of the invention is to provide such a device wherein the projections and grooves extend beyond the maximum diameter of the threads.

Figure 1:
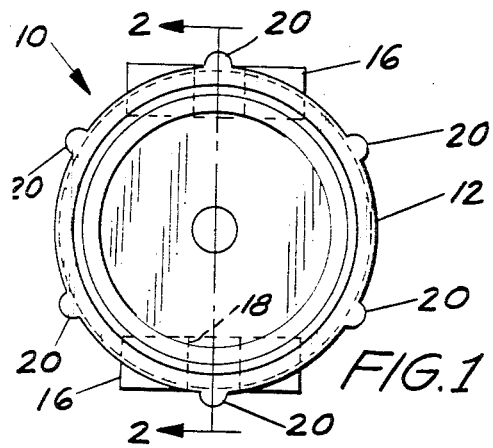
Figure 2:
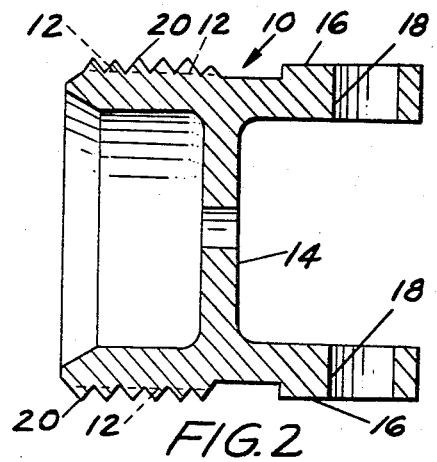
Figure 4:
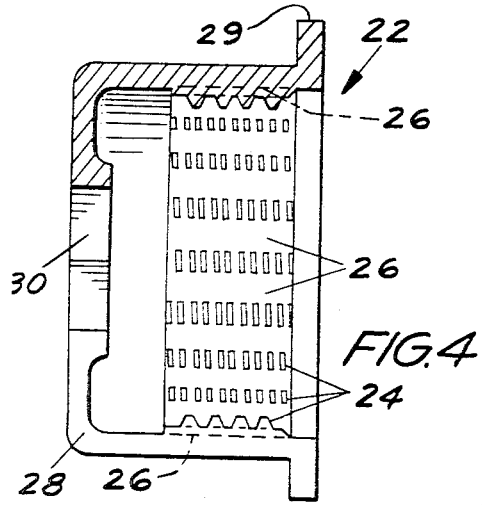
Figure 3:
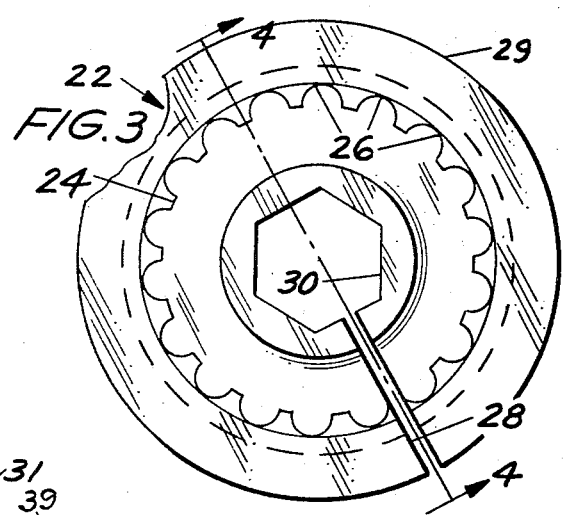
Figure 5:
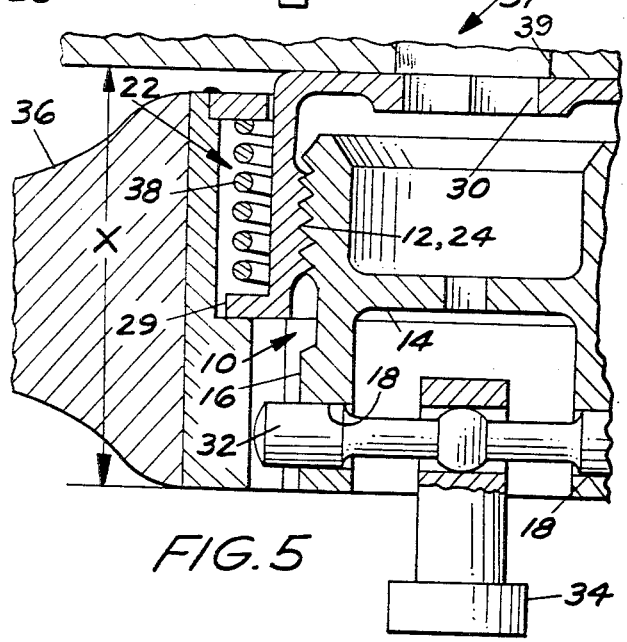
Figure 6:
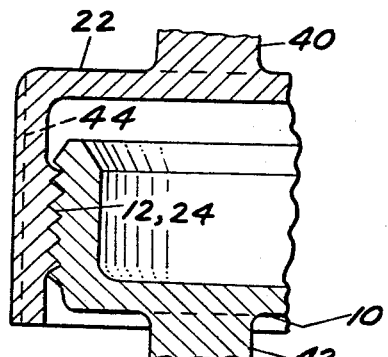

Other objects and advantages of the invention will become more apparent when reference is made to the following specification and the accompanying drawings wherein:

FIGURE 1 is an end view of the male element of a device embodying the invention;
FIGURE 2 is a cross-sectional view taken along the plane of line 2—2 of FIGURE 1 and looking in the direction of the arrows;
FIGURE 3 is an end view of the female element of a device embodying the invention;
FIGURE 4 is a cross-sectional view taken along the plane of line 4—4 of FIGURE 3 and looking in the direction of the arrows;
FIGURE 5 is a fragmentary cross-sectional view of an assembly of the elements shown by FIGURES 1-4, as employed in a particular application; and
FIGURE 6 is a fragmentary cross-sectional view of a modified assembly of the elements shown by FIGURES 1-4.

Referring now to the drawings in greater detail, FIGURES 1 and 2 illustrate a cylindrical element or member 10 which has threads 12 formed on the outer surface thereof. Depending upon the application, the member may include a closed or open end 14 and a pair of tabs 16 extending from the end 14. The tabs 16 may include openings 18 formed therein, providing means for connecting the member 10 to an associated mechanism, as will be explained.

The threaded outer surface includes a plurality of projections or protuberances 20 formed along the length thereof; that is, aligned projections 20 are formed in any suitable manner, across the threads 12. There may, for example, be six such sets of aligned projections 20 equally spaced around the outer periphery of the member 10, the projections 20 extending a predetermined distance beyond the outermost diameter of the threads 12, for a purpose to be described.

Referring now to FIGURES 3 and 4, the female element is a hollow cylindrical member 22 having threads 24 formed on the inner surface thereof to match the outer threads 12 formed on the member 10. Additionally, the member 22 includes a plurality of longitudinal grooves 26 formed across the threads 24, said grooves extending beyond the major diameter of the threads substantially the same distance as the projections 20 extend beyond the diameter of threads 12. The number of grooves 26 may be the same as, or any multiple of, the number of projections 20 formed on the member 10. The angular spacing of the grooves 26 is such that at each locking position projection 20 on member 10 mate with a corresponding number of grooves in member 22. Thus, all for example, 18 equally spaced grooves 26 and 6 rows of equally spaced aligned projections 20 would provide 18 separate adjustment and locking positions for every complete turn of one member 10 and 22 relative to the other.

As illustrated in FIGURE 3, the female member 22 also includes at least one split or slot 28 formed through one side thereof and may include a flange 29. The split or slot 28 may be formed by means of a saw-cut or by any other suitable machining operation. Means for turning member 22, such as a hexagonal opening 30, may be formed on the unthreaded end thereof.

The projections 20 and grooves 26 on the members 10 and 22 respectively, may be formed, for example, by machining after threading or casting prior to threading.

Referring now to FIGURE 5, which illustrates a specific typical application of an assembled device 31, it may be noted that a pin 32 may be press-fitted or otherwise held in place in the openings 18, and any movable member, such as a servo valve, represented in block form as 34, may be pivotally or fixedly secured to the pin 32. A member represented by reference numeral 36 which may be the acceleration lever of a fuel control mechanism, for example, may be operatively connected to the female member 22 in any convenient manner, such as by being retained against the flange 29 by a spring 38, as illustrated.

Insofar as the operation of the device 31 is concerned, when an Allen wrench (not shown) is inserted through the opening 39 (FIGURE 5) and into the hexagonal opening 30, the female member 22 can be rotated relative to the male member 10, causing the latter to be moved inwardly or outwardly, thereby resetting the location of the movable member 34.

As one of the members 10 and 22 is rotated relative to the other, each row of projections 20 will be forced out of their respective grooves 26, causing the split or slot 28 to spread within the elastic limit of the material while the projections 20 follow the threads 24 to the next set of grooves 26, at which time each row of projections will drop or "click" into the next set of grooves 26 and the female member 22 will return to its normal shape. The number of clicks will determine the change in the over-all combined length X of the members 10 and 22, thus resetting the location of the associated movable member 34 and the distance between the members 34 and 36.

For example, for a device 31 with threads having a .025" pitch and 18 grooves 26, each "click" will result in .025/18, or approximately .0014", change in over-all length X. Obviously, as the projections 20 drop into a new set of grooves 26, and the assembly returns to its normal shape, the new setting will be "locked," until such time as torque sufficient to spread the slot 28 is again applied to one of the members 10 and 22.

It should be apparent that the split or slot 28 could just as well be formed in the male member, provided that it is wide enough to permit sufficient compression thereof, as opposed to expansion of the female member, while the projections are being moved from one groove to another. It should also be apparent that the projections 20 and grooves 26 could be formed on the opposite members, if desired, and that the thickness of the piece in which the slot 28 is formed determines in part the torque or locking force.

As illustrated in FIGURE 6, it should be further apparent that the male and female members could be formed on the adjacent ends of any two elements represented generally as 40 and 42, which required a locking adjustable connection, and without tabs 16 or an opening 18. In other words, in lieu of a lever 36, the female member 22 could be an extension of substantially any kind of element or member 40, and, in lieu of the members 16, 32 and 34, the male member 10 could be an extension of substantially any kind of element or member 42. The turning means could just as well be any means, such as "flats" 44 formed on the outer peripheral surface of the female member, in place of the hexagonal opening 30.

In summary, it should be apparent that the projections 20, grooves 26 and slot 28 associated with threaded members, form the important elements of the invention and represent a novel adjustable locking device.

While but two embodiments of the invention have been shown and described for purposes of illustration, it is apparent that other modifications of the invention may be possible within the scope of the appended claims.

What I claim as my invention is:

1. An adjustment and locking device, comprising male and female threaded members, first means for adjusting one member relative to the other and automatically locking the same upon completion of the adjustment, second means associated with said female member for connection to a movable member, and third means associated with said male member for rotating said male member relative to said female member.

2. An adjustment and locking device, comprising male and female threaded members, first means for adjusting one member relative to the other and automatically locking the same upon completion of the adjustment, second means associated with said male and female members for attaching additional members to said male and female members, and third means for rotating said female member relative to said male member to vary the distance between the attached members.

3. An adjustment and locking device, comprising male and female threaded members, first means for adjusting one member relative to the other and automatically locking the same upon completion of the adjustment, tabs formed on one end of said male member, openings formed through said tabs, and a tool-engaging surface formed on an unthreaded end of said female member.

4. An axial adjustment and locking device, comprising first and second coacting engaging members, one of said members having formed thereon a plurality of circumferentially spaced axially extending and radially directed protuberances, the other of said members having formed therein a plurality of axially extending and radially directed grooves, said grooves being of a configuration adapted to at times receive therein said protuberances of said one of said members, said other of said members having a threaded portion formed thereon in a manner so as to have said grooves at least partially interrupt the otherwise continuous form of said thread, said one of said members also being threaded in a manner so as to have a generally continuous thread, said generally continuous thread being comprised of first axially extending threaded segments circumferentially between said protuberances and interconnecting second axially extending threaded segments formed in said plurality of protuberances, said first threaded segments between said protuberances having a first preselected thread depth and said second threaded segments having a second thread depth greater than said first preselected thread depth, said threaded portion on said other member and said second axially extending threaded segments being effective for cooperative threadable engagement in order to achieve relative axial movement between said first and second coacting members whenever said first and second coacting members are rotated relative to each other, said grooves being effective to receive therein said protuberances whenever said first and second coacting members have been rotated relative to each other sufficiently to move said protuberances and said second axially threaded segments formed in said protuberances out of threaded engagement with said threaded portion formed in said other of said members and into juxtaposition with said grooves.

5. An axial adjustment and locking device according to claim 4 wherein the arithmetic number of said plurality of protuberances is a multiple of the arithmetic number of said plurality of said grooves.

6. An axial adjustment and locking device according to claim 4 wherein said threaded portion formed on said other member and said first axially extending threaded segments between said protuberances coact with each other to maintain threaded engagement between said first and second coacting engaging members and maintain the existing relative axial positions thereof whenever said protuberances and said grooves are in juxtaposition.

7. An axial adjustment and locking device according to claim 6 wherein at least one of said first and second coacting members has at least one generally axially extending slit formed therein.

8. An axial adjustment and locking device according to claim 7 including means formed on at least one of said first and second coacting engaging members for rotating one of said first and second coacting engaging members relative to the other of said members.

9. An axial adjustment and locking device according to claim 7 wherein said second axially extending threaded segments formed in said plurality of protuberances are effective to engage said threaded portion formed in said other member and cause general radial displacement of said other member as permitted by said at least one slit whenever said one and said other coacting engaging members are rotated relative to each other so as to move said protuberances out of juxtaposition with said grooves and into juxtaposed threaded engagement with said threaded portion of said other member.

References Cited

UNITED STATES PATENTS

| | | | |
|---|---|---|---|
| 2,979,964 | 4/1961 | Musser | 74—424.8 |
| 3,167,105 | 1/1965 | Rosan | 151—11 |
| 3,329,875 | 7/1967 | Demeritt | 74—424.8 |

FRED C. MATTERN, JR., *Primary Examiner.*

F. D. SHOEMAKER, *Assistant Examiner.*